(12) United States Patent
Ghirardelli

(10) Patent No.: US 12,195,394 B2
(45) Date of Patent: Jan. 14, 2025

(54) RECYCLING APPARATUS OF USED BITUMINOUS CONGLOMERATE AND AN AIRTIGHT SUPPORT DEVICE FOR ROTATING CYLINDERS

(71) Applicant: Giorgio Ghirardelli, Argenta (IT)

(72) Inventor: Giorgio Ghirardelli, Argenta (IT)

( * ) Notice: Subject to any disclaimer, the term of this patent is extended or adjusted under 35 U.S.C. 154(b) by 114 days.

(21) Appl. No.: 18/028,118

(22) PCT Filed: Sep. 23, 2021

(86) PCT No.: PCT/IB2021/058686
§ 371 (c)(1),
(2) Date: Mar. 23, 2023

(87) PCT Pub. No.: WO2022/064417
PCT Pub. Date: Mar. 31, 2022

(65) Prior Publication Data
US 2023/0373857 A1    Nov. 23, 2023

(30) Foreign Application Priority Data

Sep. 25, 2020    (IT) .................. 102020000022684

(51) Int. Cl.
| | |
|---|---|
| C04B 18/167 | (2023.01) |
| B28C 5/46 | (2006.01) |
| B28C 7/00 | (2006.01) |
| C04B 26/26 | (2006.01) |
| C04B 111/00 | (2006.01) |

(52) U.S. Cl.
CPC .............. *C04B 18/167* (2013.01); *B28C 5/46* (2013.01); *B28C 7/003* (2013.01); *C04B 26/26* (2013.01); *C04B 2111/0075* (2013.01)

(58) Field of Classification Search
None
See application file for complete search history.

(56) References Cited

U.S. PATENT DOCUMENTS

| | | | | |
|---|---|---|---|---|
| 4,174,949 A | * | 11/1979 | Swisher, Jr. ........ | E01C 19/1004 432/58 |
| 4,240,754 A | * | 12/1980 | Mendenhall ........ | E01C 19/1027 366/4 |
| 4,705,404 A | * | 11/1987 | Bruggemann ........ | E01C 19/105 366/14 |
| 4,955,722 A | * | 9/1990 | Marconnet .......... | E01C 19/1004 432/118 |
| 5,303,999 A | * | 4/1994 | Nath ..................... | F26B 11/028 366/132 |
| 5,344,229 A | * | 9/1994 | Nath ..................... | F26B 25/005 432/103 |
| 5,397,177 A | * | 3/1995 | Swisher, Jr. ........ | E01C 19/1063 366/15 |
| 2015/0029809 A1 | * | 1/2015 | Brock ................. | F26B 11/0445 366/22 |
| 2019/0119866 A1 | * | 4/2019 | Baumrind ............... | E01C 23/06 |
| 2019/0153681 A1 | * | 5/2019 | Christian ............... | E01C 11/005 |

(Continued)

FOREIGN PATENT DOCUMENTS

WO    WO 2017/173555 A1    10/2017

*Primary Examiner* — Yung-Sheng M Tsui
(74) *Attorney, Agent, or Firm* — Endurance Law Group PLC

(57) ABSTRACT

A recycling apparatus of used bituminous conglomerate and an airtight support device for rotating cylinders are described.

11 Claims, 5 Drawing Sheets

(56) References Cited

U.S. PATENT DOCUMENTS

2020/0071888 A1* 3/2020 Pirazzini ............ E01C 19/1009
2021/0189664 A1* 6/2021 Sockwell ............ E01C 19/1004
2021/0381175 A1* 12/2021 Swanson ............ E01C 19/1072

* cited by examiner

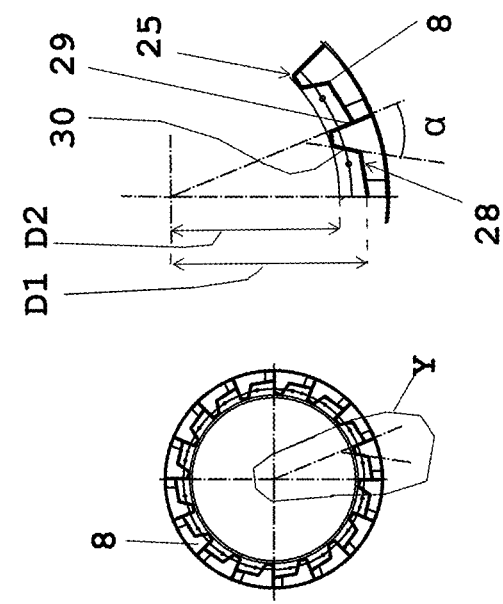
FIG. 4
FIG. 3
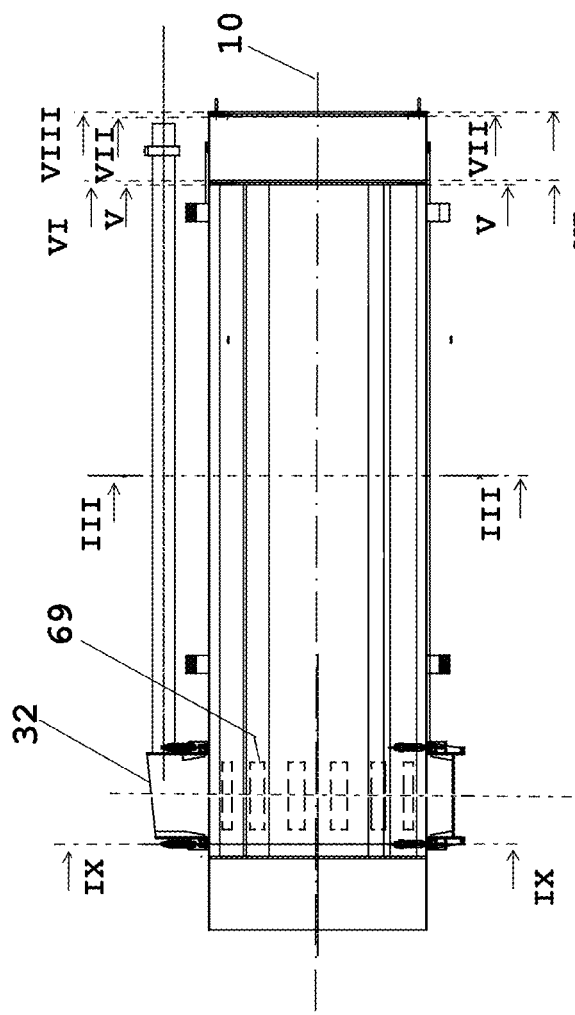
FIG. 2
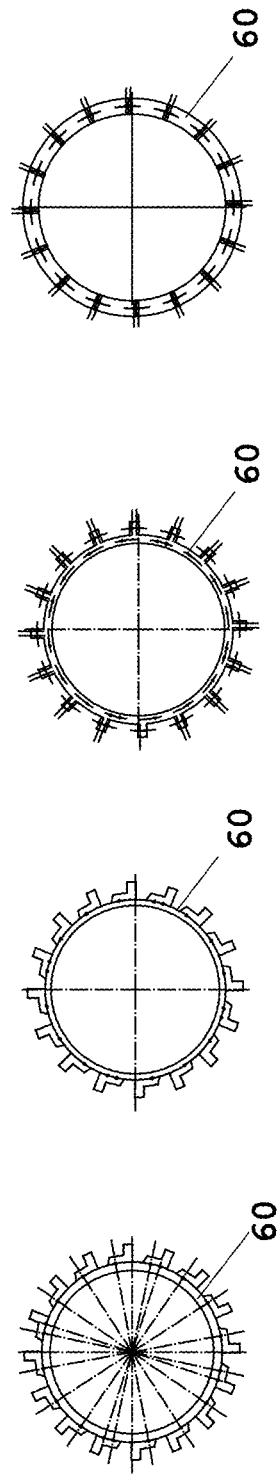
FIG. 8
FIG. 7
FIG. 6
FIG. 5

RECYCLING APPARATUS OF USED BITUMINOUS CONGLOMERATE AND AN AIRTIGHT SUPPORT DEVICE FOR ROTATING CYLINDERS

FIELD OF THE INVENTION

The present invention relates to the technical sector concerning methods and apparatus for the bituminous conglomerate, which is used bituminous crushed and derives from removal of one or more layers of a road surface with the purpose of re-utilising it for the production of a further bituminous conglomerate utilisable for the production of one or more layers of a road surface by compaction thereof.

DESCRIPTION OF THE PRIOR ART

It is known that for the hot-production of a bituminous conglomerate (also known as asphalt), utilisable for the production of one or more layers of a road surface by compaction thereof, it is necessary to dry a mixture of aggregates and bitumen and/or bituminous substances obtained by recycling the used bituminous conglomerate, prior to heating the mixture to a temperature that is such as to enable the bitumen and/or the bituminous substances to adhere externally to the aggregates. This can be carried out in suitable drying apparatus which comprise a rotating cylinder the inside of which is heated by a burner.

With the aim of reducing production costs of the bituminous conglomerate, recycling of bituminous conglomerate, used crushed and deriving from removal of one or more layers of a road surface has been attempted. This has led to a modification in the drying apparatus, as it is preferable that it is not infed together with the mixture of aggregates and bitumen.

For this aim the Applicant filed Italian patent application no. IT 102001900966877 which includes a description of a drying apparatus, comprising a rotating cylinder that defines a mixing and drying chamber and a burner located internally of the chamber coaxially to the rotation axis of the rotating cylinder. This apparatus enables recycling of the used and reclaimed bituminous conglomerate which, in the apparatus, is separated into the relative aggregates and into the relative bitumen. Unfortunately the used bituminous conglomerate cannot be mixed with the mixture of aggregates and bitumen in a percentage of greater than 40-50% since an ideal mixture of aggregates and bitumen for the production of a bituminous conglomerate, utilisable for the production of one or more layers of a road surface by compaction thereof, should have a temperature of about 160° C., but at that temperature the used and reclaimed bituminous conglomerate infed by the drying apparatus tends to deposit along the wall of the mixing and drying chamber clogging the mixing chamber and resulting in a machine stop to clean the chamber with consequent costs in terms of labour. Further, this leads, apart from the risk of generating flames due to the combustion of the reclaimed used bituminous conglomerate deposited on the wall, to the generation of fumes comprising super-heated TOC (total organic carbon) exiting from the chamber and the risk of damaging and/or burning the filters included in an filter device connected to the apparatus. Alternatively the mixture of aggregates and bitumen can be heated to 190°, in this way preventing clogging, but with generation of fumes that can contain a greater quantity of TOC and a greater quantity of energy is used to reach the temperature. Further, 190° C. a partial crystallisation takes place and/or burning of the bitumen and/or of the bituminous substances which significantly lowers the quality of the dried mixture and of the deriving bituminous conglomerate utilisable for the production of one or more layers of a road surface by compaction thereof.

WO201717355 describes a method and an apparatus for heating granulated recovered bituminous material, the method of WO201717355 includes the recovered granulated bituminous material being conveyed through a heated rotating cylinder the internal surfaces whereof, at a relative infeed zone, are heated by a flow of hot gas in outlet from a hot gas generator to prevent agglomeration of the recovered material in the heated rotating cylinder.

SUMMARY OF THE INVENTION

The main aim of the present invention consists in reducing and/or obviating the above-cited disadvantages with respect to the methods and the apparatus that enable recycling used and reclaimed bituminous conglomerate.

In particular the main aim of the present invention is to recycle a percentage of used and reclaimed bituminous conglomerate in the production of a further utilisable bituminous conglomerate for the production of one or more layers of a road surface by compaction thereof, in particular enabling the recycling of a percentage of 80%-100% thereof. In particular, an aim of the present invention is to reduce the energy cost of obtaining a dried mixture of aggregates and bitumen and/or bituminous substances.

A further aim of the invention consists in preventing the formation of blockages and clogging of used and reclaimed bituminous conglomerate in a mixing and drying chamber and the consequent advantages deriving therefrom, as described in the foregoing.

A further aim is to obtain a dried mixture and a utilisable bituminous conglomerate, usable for the production of one or more layers of a road surface by compaction thereof, of high quality and free of crystallised and/or burnt bitumen.

The above-mentioned aims and advantages are obtained according to the contents of the independent claims.

By virtue of the external heating of the first wall, according to the invention deposits of used and reclaimed bituminous conglomerate are avoided as well as the consequent clogging inside the recycling apparatus of the present invention, and the drawbacks deriving therefrom.

The Applicant has shown that, according to the invention, the percentage of used and reclaimed bituminous conglomerate in the production of a further utilisable bituminous conglomerate for the production of one or more layers of a road surface by compaction thereof is greater than with the prior art and, in particular, can be 80%-100%.

The more-or-less total recycling enables totally recycling the aggregates of which the asphalt is made up and thus significantly limiting the exploitation of quarries and therefore the land. Further, much less "virgin" bitumen, with a cost correlated to that of crude oil, is used. This enables keeping production costs low and more stable than in the prior art and significantly lower with respect to the use of "virgin" raw materials (i.e. not previously used), or raw materials.

BRIEF DESCRIPTION OF THE DRAWINGS

Specific embodiments of the invention will be described in the following part of the present description, according to what is set down in the claims and with the aid of the accompanying tables of drawings, in which:

FIG. 2 is a schematic view in longitudinal section of a group of components of the apparatus of FIG. 1;

FIG. 3 is a schematic section view of the group of components of FIG. 2 along plane III of FIG. 2;

FIG. 4 is an enlarged view of detail Y of FIG. 3;

FIG. 5 is a schematic section view of the group of components of FIG. 2 along plane V-V of FIG. 2;

FIG. 6 is a schematic section view of the group of components of FIG. 2 along plane VI-VI of FIG. 2;

FIG. 7 is a schematic section view of the group of components of FIG. 2 along plane VII-VII of FIG. 2;

FIG. 8 is a schematic section view of the group of components of FIG. 2 along plane VIII-VIII of FIG. 2;

DESCRIPTION OF PREFERRED EMBODIMENTS

Figure 1:
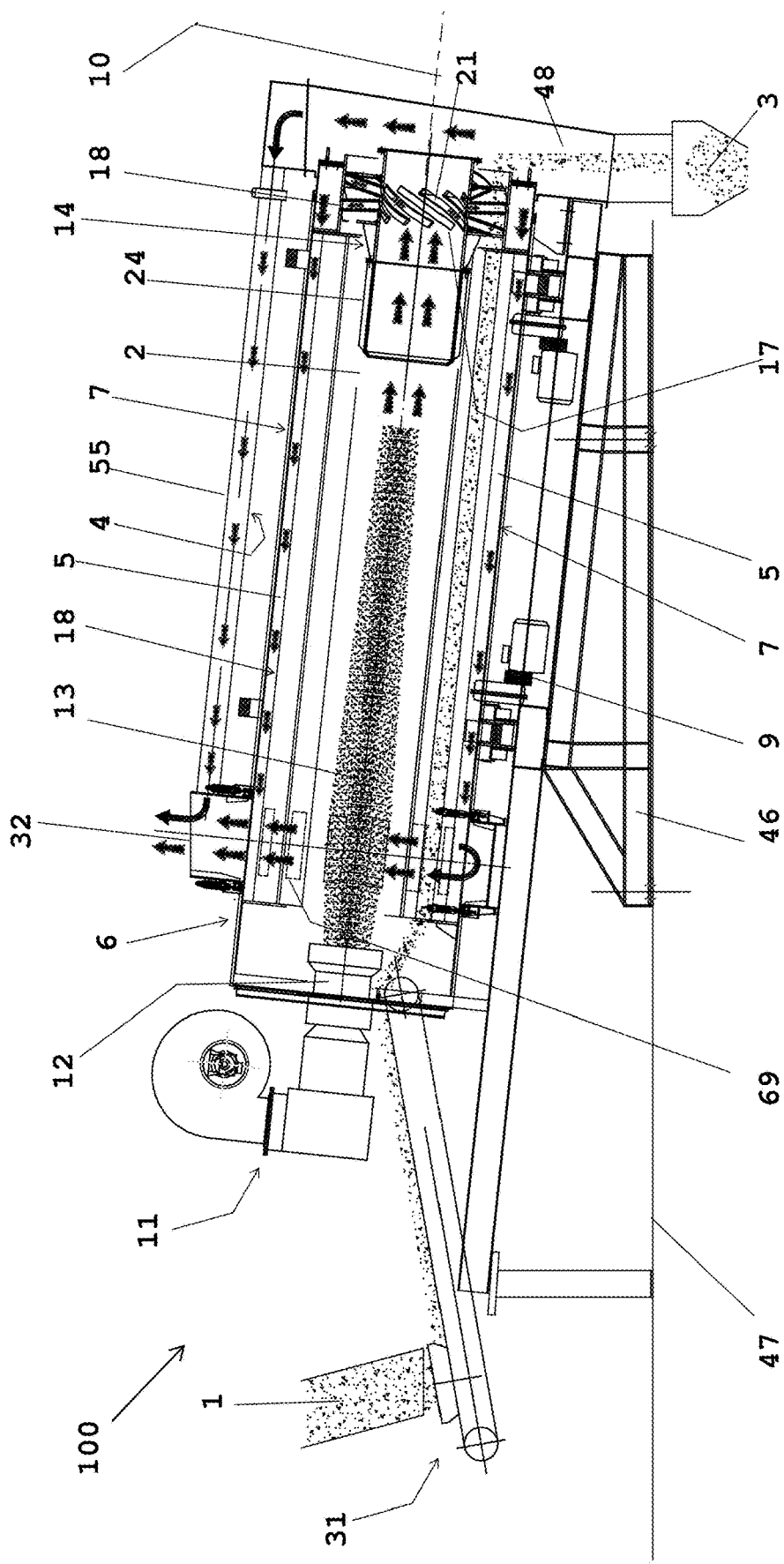
FIG. 1 is a schematic view in longitudinal section of the recycling apparatus of used bituminous conglomerate according to the invention.
Figure 11:
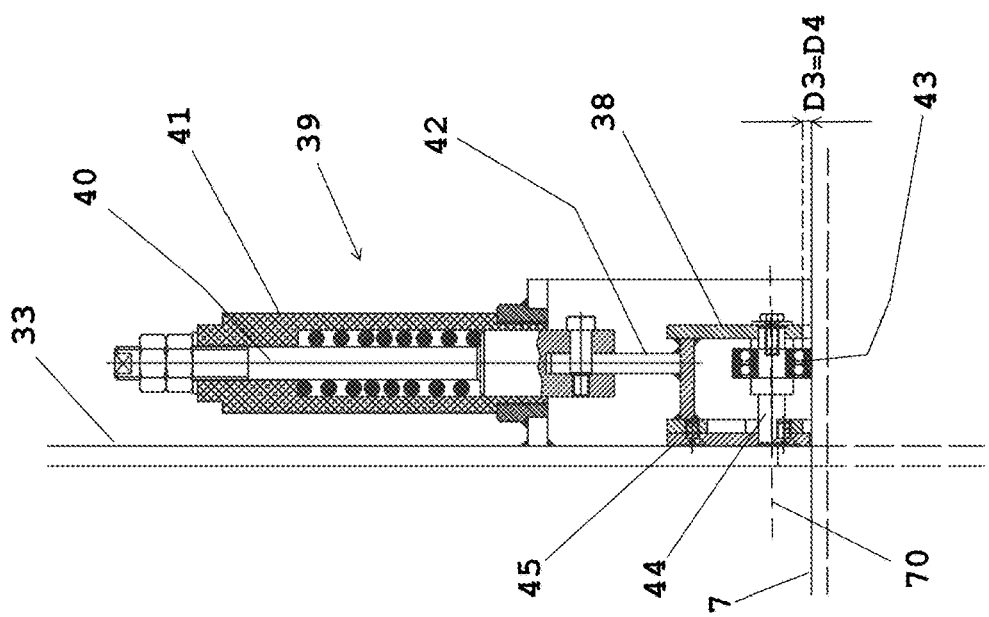
FIG. 11 is a larger-scale lateral view of detail K of FIG. 11 with some details omitted for the sake of clarity.
Figure 10:
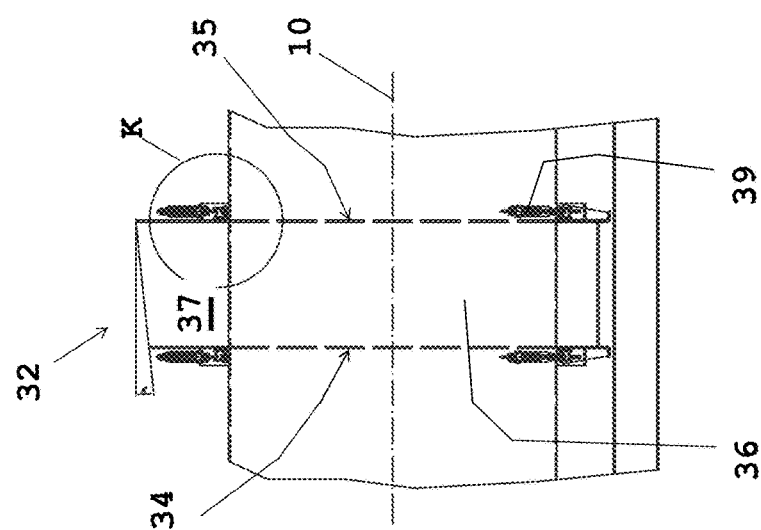
FIG. 10 is a schematic section view of the group of components of FIG. 2 long section X-X of FIG. 9.

With reference to FIG. 1, reference numeral (100) denotes a recycling apparatus of used bituminous conglomerate which enables actuating the following recycling method of used bituminous conglomerate, which comprises following steps:

A) predisposing bituminous conglomerate (1) which is used crushed (also known as reclaimed asphalt) and deriving from removal of one or more layers of a road surface;

B) heating the bituminous conglomerate in a mixing and drying chamber (2) which is rotating and, at least partially, delimited by a first tubular wall (4), preferably cylindrical, to obtain a mixture (3) of aggregates and bituminous materials while at least a part of the gaseous substances present in the mixing and drying chamber (2) is conveyed externally thereof in order to externally heat the first tubular wall (4) with the aim of preventing bituminous substances from internally depositing on the first tubular wall (4).

Figure 22:
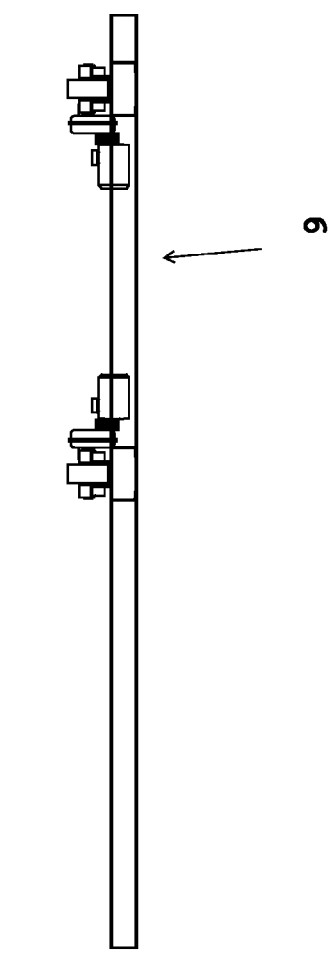
FIG. 22 is a schematic lateral view of a second component of the apparatus of FIG. 1.
Figure 18:
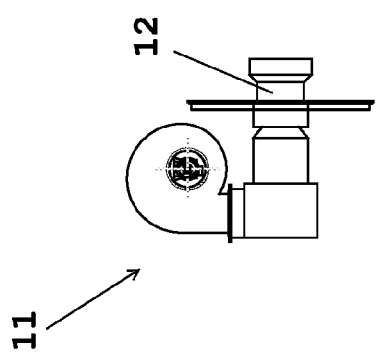
FIG. 18 is a schematic lateral view of a second component of the apparatus of FIG. 1.

The method is actuable with a recycling apparatus (100) of bituminous conglomerate, which is used crushed and deriving from removal of one or more layers of a road surface, according to claim 1. The recycling apparatus (100) comprises:

a rotating cylinder (6) comprising: a first rotation axis (10), which is longitudinal, a first wall (4) which is tubular and which internally at least partially defines a mixing and drying chamber (2, which is rotating; a plurality of mixing elements (8), preferably at least partially solidly constrained to the first wall (4), for remixing the bituminous conglomerate, which is used, crushed and deriving from removal of one or more layers of a road surface, when it is fed into the mixing and drying chamber (2); and a rotation device (9) (see FIG. 22) in order to rotate (43) at least the mixing and drying chamber (2) about the first rotation axis (10);

a burner (11) (see FIG. 18) having at least a relative flame portion (12) which is situated internally of the mixing and drying chamber (2), at a first side thereof, preferably longitudinal;

an gaseous substances conveying device (14) predisposed to be able to convey at least a part of the gaseous substances present in the mixing and drying chamber (2) externally on the first wall (4), in order, when the burner (11) is activated, to heat the chamber (2) externally.

With reference to FIG. 1, it is preferable that the burner (11) is arranged at the first side of the mixing and drying chamber (2) in such a way that, when actuated, the relative flame (12) is situated internally of the mixing and drying chamber (2).

It is clear that with the recycling apparatus (100) of the invention is possible externally heating the first wall (4) of the mixing and drying chamber (2) by actuating the recycling method of the invention and attaining the advantages mentioned in the foregoing.

It is preferable in the recycling method, the relative step B) comprises conveying the part of the gaseous substances into a first air space (5), defined on a relative side, by the external surface (68) of the first wall (4). Therefore, for this purpose, in the recycling apparatus of the invention, the rotating cylinder (6) further comprises a second wall (7), which is external, tubular and arranged externally of the first wall (4), and which, together with the first wall (4), defines a first air space (5), which is tubular and hydraulically connectable to an aspirating device and wherein the gaseous substances conveying device (14) is solidly constrained to the rotating cylinder (6) and internally of the mixing and drying chamber (2) on a second side thereof opposite the relative first side and preferably longitudinal. Further, the conveying device (14) in turn comprises: a third wall (15) which is tubular and surrounds the first rotation axis (10) and has a relative external surface (68); a first plurality of first through-holes (17) arranged along a first section of the third wall (15) perpendicular to the first rotation axis (10), a fourth wall (16) which is tubular and arranged externally and solidly to the third wall (15) and having a relative inner surface (27); a corresponding plurality of second through-holes (18) (i.e. numerically corresponding) to the first plurality of first through-holes (17) and arranged along a second section of the fourth wall (16) perpendicular to the first rotation axis (10), a plurality of linking elements (20) corresponding (i.e. numerically corresponding) to the first plurality of first through-holes (17), wherein each linking element (20) of the plurality of linking elements (20) comprises a second air space (21) which originates from a different first through-hole of the plurality of first through-holes and terminates in a different second through-hole (18) of the plurality of second through-holes (18) hydraulically connecting only the relative first through-hole (17) to the relative second through-hole (18), wherein the plurality of linking elements (20) is conformed so as to define, externally and together with: the external surface (68) of the third wall (15); the inner surface (27) of the fourth wall (16), a plurality of channels (22) through which a mixture of aggregates and bitumen can be conveyed in an advancement direction substantially parallel to the first rotation axis (10); and wherein the second plurality of through-holes (18) is in hydraulic connection with the first air space (5); for, when the first air space (5) is hydraulically connected to an aspirating device, the burner (11) is activated and bituminous conglomerate, which is used, crushed and deriving from removal of one or more layers of a road surface, is fed into the mixing and drying chamber (2), conveying, into the first air space (5), the hot gaseous substances from the mixing and drying chamber (2) through the first plurality of first through-holes (17), the second plurality of second gaps (21) and the second plurality of second through-holes (18) externally heating the first wall (4) of the mixing and drying chamber (2); and optionally, an aspirating device, externally fixed to the rotating cylinder (6) distally to the gaseous substances conveying device (14), and fixed with respect to the first rotation axis (10), wherein the aspirating device is hydraulically connected at least to the first air space (5).

As visible in FIGS. 1 and 2, the first air space can be in hydraulic connection with the conveying device (14) and can be in hydraulic connection with the aspirating device, not illustrated, via a plurality of slits (69) preferably arranged in the second wall (7) at the third section of the rotating cylinder (6) which is transversal to the first rotation axis (10) and which is preferably arranged in proximity or at the first side of the mixing and drying chamber (2) (see FIGS. 1 and 2).

With reference to FIG. 1, the pathway of the gaseous substances present in the mixing and drying chamber (2) is indicated by the arrows which pass through the first plurality of first through-holes (17), the second plurality of second gaps (21) and the second plurality of second through-holes (18) of the gaseous substances conveying device (14) through the first air space (5) externally heating the first wall (4) of the mixing and drying chamber (2) and through the plurality of slits (69).

The gaseous substances can be aspirated to an aspirating device and then optionally conveyed into a filter device. The aspirating device can be advantageously contained in an aspiration system located in the room in which the recycling apparatus is destined to be installed or can be comprised in the recycling apparatus (100), for example internally of an airtight support device (32), when the device (32) is included. It is for this reason that the aspirating device is optional in the recycling apparatus (100) of the invention. The flame portion (12) of the burner (11) is preferably arranged substantially coaxial to the first rotation axis (10) in such a way that the relative flames (13) are coaxial with the first rotation axis (10). The whole flame (12) is advantageously arranged internally of the mixing and drying chamber (2) (see FIG. 1).

In a further particularly preferred aspect of the invention the second wall (7) is solidly constrained to the first wall (4), as this enables arranging the rotation device (9) externally of the second wall (7) to rotate both the first and the second wall (4, 7) and simplifying the realisation of the recycling apparatus (100).

For constructional reasons, it is preferable for the first and second wall (4, 7) to be cylindrical and concentric to one another.

Likewise the third wall (15) and the fourth wall (16) can be cylindrical and more preferably also coaxial to the first rotation axis (10).

The gaseous substances conveying device (14) is solidly constrained to the rotating cylinder (6) by means of a plurality of fixing elements (60) (illustrated in FIGS. 5-8).

Each linking element (20) advantageously has a relative wall inclined by an angle different to 90° with respect to the first rotation axis (10), and is preferably helical due to the conveying of the dried mixture of aggregates and bitumen. In a particularly preferred aspect of the invention, the third wall (15) of the conveying device (14) comprises a relative portion (24) that projects from the fourth wall (16) of the conveying device (14) towards the first side of the mixing and drying chamber (2), wherein the first plurality of through-holes is not arranged in the wall portion in order to be able to function as a combustion chamber of any non-combusted gaseous substances present in the mixing and drying chamber (2) when the burner (11) is operating. In this case it is ensured that non-combustion TOC gaseous substances are not emitted. In fact, the portion of the third wall (15) is the closest to the flame and reaches a temperature such as to burn any TOC gaseous substances present in the mixing and drying chamber.

In an aspect of the invention the aspirating device is fixed at the first side of the drying chamber, in order to heat all of the first wall.

The plurality of mixing elements (8) can comprise a plurality of blades fixed to the first wall (4) and/or to a shaft coaxial to the first rotation axis (10). The plurality of blades is preferably fixed to the first wall (4).

In a particularly preferred aspect of the invention, the plurality of mixing elements (8) comprises a plurality of protuberances (25) (see FIGS. 3 and 4), and the first wall (4) forms the plurality of protuberances (25), which are conformed to move the material present in the mixing and drying chamber partially in rotation about the rotation axis.

For this reason the first wall (4) can comprise: a plurality of first regions (28), a plurality of second regions (29) and a plurality of third regions (30), corresponding (i.e. numerically corresponding) to the plurality of protuberances (25). Each first region (28) of the plurality of first regions (28) is arranged between a different second region (29) of the plurality of second regions (29) and a different third region (30) of the plurality of third regions (30). Each first region (28) of the plurality of first regions (28) is arranged at a first minimum distance (D1 with respect to the first rotation axis (10). Each second region (29) of the plurality of second regions (29) originates from a relative first region (28) and is radially arranged with respect to the first rotation axis (10) at a second minimum distance (D2) from the first rotation axis (10) that is smaller than the first minimum distance (D1). Each third region (30) of the plurality of third regions (30) originates from the relative second region (29) of the plurality of second regions (29) and extends up to a relative first region (28) of the plurality of first regions (28); is at least partially inclined with respect to the relative second region (29) by an angle ($\alpha$) comprised between 80° and 130° (preferably between 90° and 120°, more preferably 100° and 110°, advantageously 105°), measured in the rotation direction of the first rotation axis (10); and extends up to the first region (28). In this matter, see FIG. 4. These protuberances (25) move the material present in the mixing and drying chamber (2) into the mixing and heating chamber by virtue of the rotation of the rotating cylinder (6) about the rotation axis. When the relative protuberance (25) rotates (43) upwards, as defined above, it facilitates the fall of the material moved before reaching the topmost point, preventing the material dropping from above from falling onto the flame of the burner (11), especially when the flame portion (12) of the burner (11) is arranged substantially coaxial to the first rotation axis (10) in such a way that the relative flames (13) are coaxial with the first rotation axis (10).

A first region (28), the third region (30) adjacent to the first region (28) and the second region (29) adjacent to the third region are advantageously in a single body and define a radial structural element. A plurality of the radial structural elements can be appropriately fixed to the second wall (7) and each radial structural element can be appropriately fixed to an adjacent further radial structural element to together realise the first wall (4).

The apparatus (100) of the invention can further comprise an infeeding device (31) of crushed material arranged: at the first side of the mixing and drying chamber (2) for infeeding the bituminous conglomerate, which is used, crushed and deriving from removal of one or more layers of a road surface, in equicurrent direction with respect to the flames (13) of the burner (11) (see FIG. 1); or arranged at the second side of the mixing and drying chamber (2) to feed the bituminous conglomerate, which is used, crushed and in countercurrent direction with respect to the flames (13) of the burner (11). The first and the second side of the drying chamber are arranged along the first and second base of the rotating cylinder.

It is preferable for at least the first tubular wall (4) to be cylindrical. More preferably, the second tubular wall (7) is cylindrical. In this case, the apparatus (100) can further comprise an airtight support device (32), comprising:

- a structural element (33) (for example a casing) internally defining an aspirating chamber (37), and comprising, on a relative first side, a first circular opening (34), and on a relative second side, opposite the first side, a second circular opening (35); the structural element (33) being arranged with the relative first and second circular opening (34.35) coaxial to the first rotation axis (10) and surrounding a third section of the rotating cylinder (6) which is transversal to the first rotation axis (10), and with the aspirating chamber (37) in hydraulic communication with the first air space (5) (for example via the plurality of slits (69)) at the third section of the rotating cylinder (6); and wherein the aspirating chamber (37) is hydraulically connected to the aspirating device;
- at least three connecting elements (38), each of which having a circular crown segment shape, having a same first radius and together defining a first closed circular crown surrounding the third section of the rotating cylinder (6) and arranged at a third distance (03) from the second wall (7) of the rotating cylinder (6);
- at least a shock absorber device (39) for each connecting element (38) included, in turn comprising: a relative shock absorber axis (40); a relative fixed portion (41), fixed to the structural element (33) the shock absorber axis (40) being radially arranged with respect to the first rotation axis (10); a relative movable portion, fixed to the fixed portion (41) with freedom to move with respect to the fixed portion (41), along the shock absorber axis (40), wherein an end of the movable portion, which is distal to the fixed portion (41), is solidly fixed to a different relative connecting element (38) in order to damp the relative connecting element (38) along the relative first radius, which is arranged radially to the rotation axis; at least a wheel (43) for each connecting element (38) included, a pivot (44) for each wheel (43) included, the at least a wheel (43) being rotatably fixed, by means of the relative pivot (44), to a different connecting element (38), distally with respect to the relative movable portion (42) and rotatably with respect to a second rotation axis (70), passing through the pivot (44) and parallel to the first rotation axis (10), in such that the at least a wheel (43) projects from the relative connecting element (38) by a fourth distance (04) identical to the third distance (03), in order to externally contact the second wall (7) of the rotating cylinder (6);
- at least a joint element (45) for each connecting element (38) included, each of which having a circular crown segment shape, having a same second internal radius and together defining a second closed circular crown surrounding the third section of the rotating cylinder (6) and arranged at a fifth distance from the second wall (7) of the rotating cylinder (6) that is smaller than the third distance (03) so as to function as a seal flange; wherein the at least a joint element (45) is fixed to the pivot (44) of a different at least a wheel (43) in such a way as to project from the relative connecting element (38) by a fourth distance (04) in order to externally contact the second wall (7) of the rotating cylinder (6).

The above-mentioned airtight support device (32) enables avoiding the use of seals made of polymeric material, for example rubber, which can rapidly degrade as they would be in contact with a rotating cylinder (6) the external wall of which is heated by the conveying of the gaseous substances in the first air space (5) and the relative machine stops due to the replacement of the seals made of degraded polymeric material.

The recycling method described herein can further comprise the following step, subsequent to step B):

C) further mixing and heating the mixture (3) of aggregates and bituminous materials obtained in step B) utilisable, by compacting, for obtaining a further utilisable bituminous conglomerate, for realising a new layer of a road surface.

For this purpose, the recycling apparatus (100) according to the invention can advantageously further comprise: a mixing and production chamber (not illustrated) of bituminous conglomerate fixed to the rotating cylinder (6) and an infeeding device of pumpable bitumen, for, when the recycling apparatus (100) is operating, continuously receiving, from the mixing and drying chamber (2), a dried mixture of aggregates and bitumen obtained by recycling, in the mixing and drying chamber (2), of the bituminous conglomerate, which is used, crushed and deriving from removal of one or more layers of a road surface, and producing, by means of addition of the pumpable bitumen, a further utilisable bituminous conglomerate for production of further bituminous conglomerate utilisable, by compacting, for realising a new layer of a road surface.

A further object of the present invention is also an airtight support device (32) for rotating cylinders, comprising:

- a structural element (33) (for example a casing) internally defining an aspirating chamber (37) which is hydraulically connectable to an aspirating device, wherein the structural element (33) comprises, on a relative first side, a first circular opening (34), and on a relative second side, opposite the first side, a second circular opening (35) wherein the first and second circular opening (18) have a relative common axis; wherein the structural element (33) is couplable to a rotating cylinder (6) having a first rotation axis (10) by being arranged externally of the rotating cylinder (6) with the common axis of the relative first and second circular opening (35) being coaxial with the first rotation axis (10) so as to surround a third section of the rotating cylinder (6), which is transversal to the first rotation axis (10), with the aspirating chamber (37) being in hydraulic communication with the rotating cylinder (6) at the first section of the rotating cylinder (6);

at least three connecting elements (38), each of which having a circular crown segment shape, having a same first radius and together defining a first closed circular crown so as to be able to surround the third section of the rotating cylinder (6) at a relative distance (03) from the rotating cylinder (6);

at least a shock absorber device (39) for each connecting element (38) included, in turn comprising: a relative shock absorber axis (40); a relative fixed portion (41), fixed to the structural element (33) the shock absorber axis (40) being radially arranged with respect to the common axis; a relative movable portion, fixed to the fixed portion (41) with freedom to move with respect to the fixed portion (41), along the shock absorber axis (40), wherein an end of the movable portion, which is distal to the fixed portion (41), is solidly fixed to a different relative connecting element (38) in order to damp the relative connecting element (38) along the relative radius arranged radially to the common axis; at least a wheel (43) for each connecting element (38) included, a pivot (44) for each wheel (43) included, the at least a wheel (43) being rotatably fixed, by means of the relative pivot (44), to a different connecting element (38), distally with respect to the relative movable portion (42) and rotatably with respect to a second rotation axis (70), passing through the pivot (44) and parallel to the axis (10), in such that the at least one wheelo projects from the relative connecting element (38) in order to be able to externally contact the rotating cylinder (6);

at least a joint element (45) for each connecting element (38) included, each of which having a circular crown segment shape, having a same second internal radius and defining a second closed circular crown, in order, when the structural element (33) is coupled to the rotating cylinder (6), so be arranged at the third section of the rotating cylinder (6) at a relative distance from the rotating cylinder (6), smaller than the distance (03) at which the first circular crown is arranged, so as to function as a seal flange; wherein the at least a joint element (45) is fixed to the pivot (44) of a different at least a wheel (43) in such a way as to project from the relative connecting element (38) by the same distance as the relative at least a wheel (43) projects from the relative connecting element (38), in order to externally contact the second wall (7) of the rotating cylinder (6).

The at least a shock absorber device (39) is advantageously arranged centrally with respect for each relative connecting element (38).

The at least a wheel (43), in a case where from three to five connecting elements (38) are included, are preferably at least two wheels and preferably three wheels (43) for each connecting element (38) included, of which one is arranged at the centre thereof and the others at the ends of the relative connecting element (38).

Figure 9:
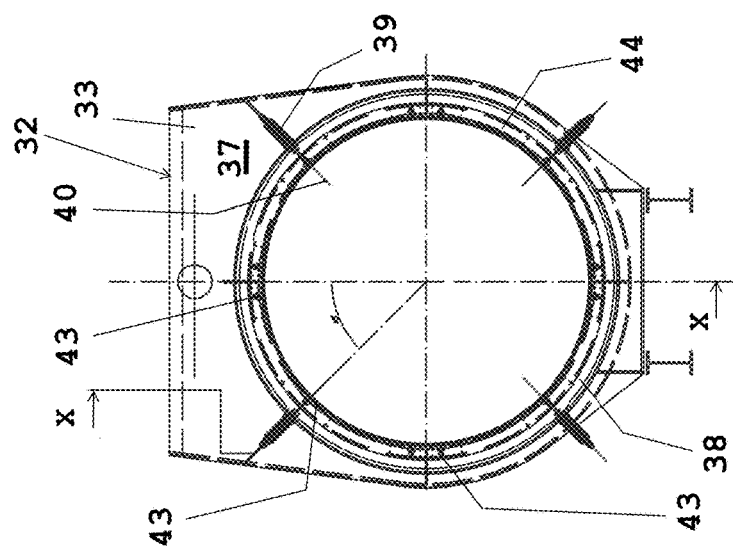
FIG. 9 is a schematic section view of the group of components of FIG. 2 along plane IX-IX of FIG. 2.
Figure 12:
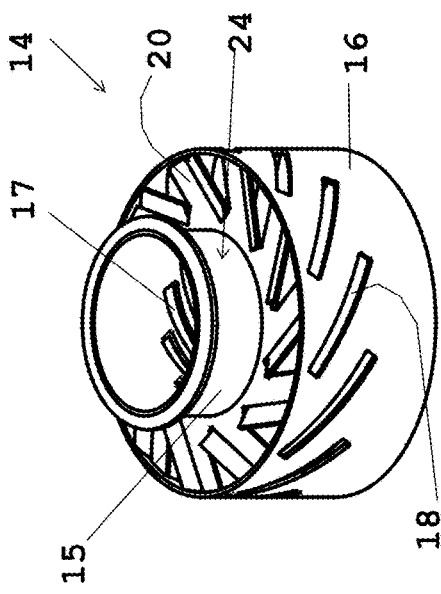
FIG. 12 is an enlarged and perspective schematic view of a first component of the apparatus of FIG. 1.
Figure 17:
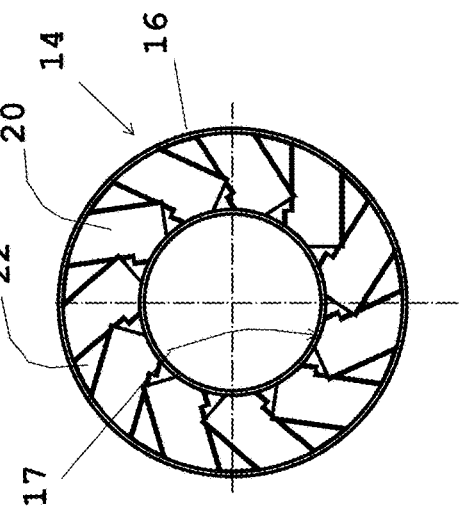
FIG. 17 is a schematic rear view of the component of FIG. 12.
Figure 14:
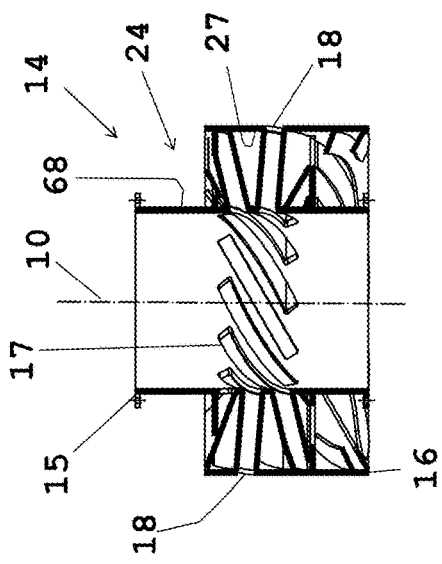
FIG. 14 is a schematic section view of the component of FIG. 12 along plane XI-XIV of FIG. 13.
Figure 16:
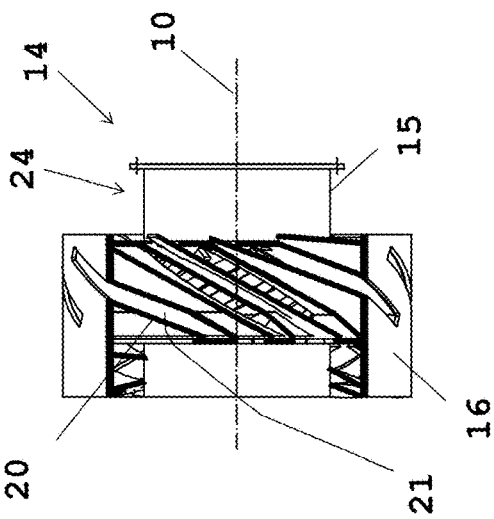
FIG. 16 is a schematic section view of the component of FIG. 12 along plane XVI-XVI of FIG. 15.
Figure 13:
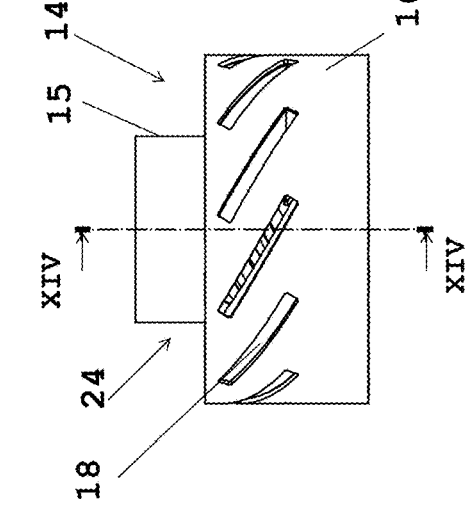
FIG. 13 is a schematic lateral view of the component of FIG. 12.
Figure 15:
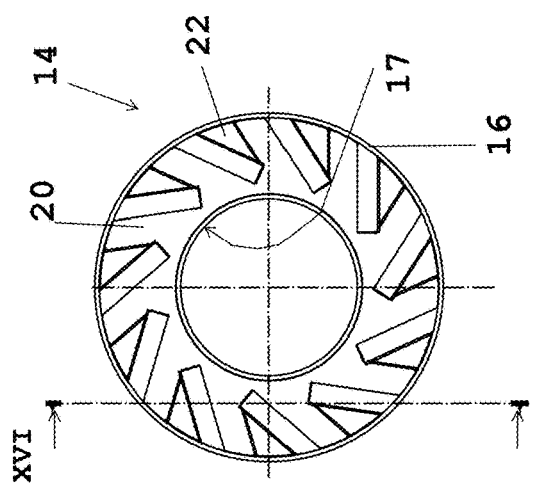
FIG. 15 is a schematic frontal view of the component of FIG. 12.
Figure 21:
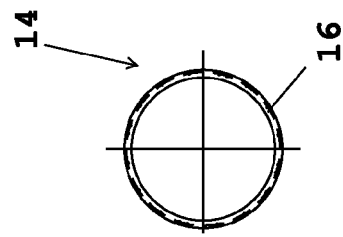
FIG. 21 is a schematic section view of the component of FIG. 19 along plane XXI-XXI of FIG. 19.

As illustrated in FIG. 9, the apparatus (100) advantageously comprises four connecting elements (38), four shock absorber devices (39) centred on the connecting element (38) and at least 2 wheels (43), preferably three wheels (43) of which one is arranged at the centre and the others at the ends of the relative connecting element (38).

Figure 23:
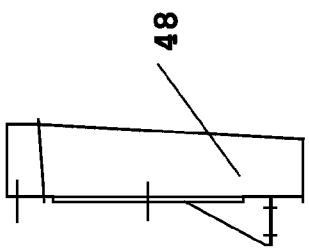
FIG. 23 is an enlarged schematic lateral view of a fourth component of the apparatus of FIG. 1.
Figure 20:
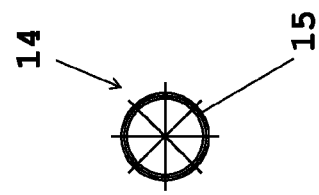
FIG. 20 is a schematic section view of the component of FIG. 19 along plane XX-XX of FIG. 19.
Figure 19:
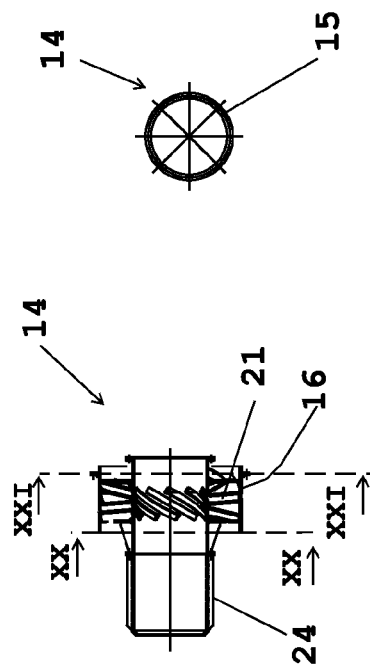
FIG. 19 is a schematic section view of a further embodiment of the first component of FIG. 12.

As illustrated in FIG. 1, the apparatus (100) can comprise—an unloading device (48) (see FIG. 23) fixed distally to the rotating cylinder at the relative second side in order to allow unloading of the dried production (3) of aggregates and bitumen, should it be desired to proceed to the realising of a further bituminous conglomerate utilising the dried mixture (3) in a discontinuous production process.

Further, in order to facilitate the unloading of the dried mixture (3) it is preferable for the first rotation axis (10) to be inclined, with respect to a rest plane (47) by 4°-8°, preferably 6°, arranging an unloading device (48) in a downwards direction. For this purpose the apparatus (100) can advantageously comprise a support element (46) predisposed to support the rotating cylinder (6) with the rotation axis (100) inclined, with respect to a rest plane (47) by 4°-8°, preferably 6°. The aspirating device can preferably be hydraulically connected to the unloading device (48) by a suction tube (55). It is understood that the above has been described by way of non-limiting example and that technical-functional variants are considered to fall within the protective scope of the invention as claimed in the following.

The invention claimed is:

1. A recycling apparatus of bituminous conglomerate, which is used, crushed and deriving from removal of one or more layers of a road surface comprising:
    a rotating cylinder comprising: a first rotation axis, which is longitudinal, a first wall which is tubular and which internally at least partially defines a mixing and drying chamber, which is rotating; a plurality of mixing elements for remixing bituminous conglomerate, which is used, crushed and deriving from removal of one or more layers of a road surface, when it is fed into the mixing and drying chamber; and a rotation device for rotating at least the mixing and drying chamber about the first rotation axis;
    a burner having a relative flame portion which is situated internally of the mixing and drying chamber, at a first side thereof;
    a conveying device of gaseous substances predisposed to be able to convey at least a part of the gaseous substances present in the mixing and drying chamber externally on the first wall, in order, when, the burner is activated, to heat it externally;
    wherein the rotating cylinder further comprises a second wall, which is external, tubular and arranged externally of the first wall and which, together with the first wall, defines a first air space air space, which is tubular and hydraulically connectable to an aspirating device and wherein the conveying device of gaseous substances is solidly constrained to the rotating cylinder and internally of the mixing and drying chamber on a second side thereof opposite the relative first side, the conveying device in turn comprising: a third wall which is tubular and surrounds the first rotation axis and has a relative external surface; a first plurality of first through-holes arranged along a first section of the third wall perpendicular to the first rotation axis, a fourth wall which is tubular and arranged externally and solidly to the third wall and having a relative inner surface; a plurality of second through-holes corresponding to the first plurality of first through-holes and arranged along a second section of the fourth wall perpendicular to the first rotation axis, a plurality of linking elements corresponding to the first plurality of first through-holes, wherein each linking element of the plurality of linking elements comprises a second air space, which originates from a different first through-hole of the plurality of first through-holes and terminates in a different second through-hole of the second plurality of through-holes, hydraulically connecting only the relative first through-hole to the relative second through-hole, wherein the plurality of linking elements is conformed so as to define, externally and together with the external surface of the third wall, the inner surface of the fourth wall, a plurality of channels through which a mixture of aggregates and bitumen can be conveyed in an advancement direction substantially parallel to the first rotation axis; and wherein the plurality of second through-holes is in hydraulic connection with the first air space; for, when; the first air space is hydraulically connected to an aspirating device; the burner is activated and bituminous conglomerate, which is used, crushed and deriving from removal of one or more layers of a road surface, is fed into the mixing and drying chamber; conveying, into the first air space, the hot gaseous substances from the mixing and drying chamber through the first plurality of first through-holes, the second plurality of second gaps and the second plurality of second through-holes externally heating the first wall of the mixing and drying chamber; and optionally, an aspirating device, externally fixed to the rotating cylinder distally to the conveying device of gaseous substances, wherein the aspirating device is fixed with respect to the first rotation axis, and wherein the aspirating device is hydraulically connected at least to the first air space.

2. The recycling apparatus of claim 1, wherein the third wall of the conveying device comprises a relative portion that projects from the fourth wall of the conveying device towards the first side of the mixing and drying chamber, wherein the first plurality of through-holes is not arranged in the wall portion in order to the portion be able to function as a combustion chamber of any non-combusted gaseous substances present in the mixing and drying chamber when the burner is operating.

3. The recycling apparatus of claim 1, wherein the plurality of mixing elements comprises a plurality of protuberances and the first wall forms the plurality of protuberances, which are conformed to move the material present in the mixing and drying chamber partially in rotation about the rotation axis.

4. The recycling apparatus of claim 1, wherein the plurality of mixing elements comprises a plurality of protuberances, wherein the first wall forms the plurality of protuberances and the aim comprises:

a plurality of first regions, a plurality of second regions and a plurality of third regions, each of said plurality corresponding to the plurality of protuberances, wherein each first region of the plurality of first regions is arranged between a different second region of the plurality of second regions and a different third region of the plurality of third regions; wherein each first region of the plurality of first regions is arranged at a first minimum distance with respect to the first rotation axis;

wherein each second region of the plurality of second regions originates from a relative first region and is radially arranged with respect to the first rotation axis at a second minimum distance from the first rotation axis that is smaller than the first minimum distance;

wherein each third region of the plurality of third regions originates from the relative second region of the plurality of second regions and extends up to a relative first region of the plurality of first regions; is at least partially inclined with respect to the relative second region by an angle comprised between 80° and 130° and measured in the rotation direction of the first rotation axis; and extends up to the first region.

5. The recycling apparatus of claim 1, further comprising a feeding device of crushed material arranged: at the first side of the mixing and drying chamber for feeding the bituminous conglomerate, which is used, crushed and deriving from removal of one or more layers of a road surface, in equicurrent direction with respect to the flames of the burner; or arranged at the second side of the mixing and drying chamber to feed the bituminous conglomerate, which is used, crushed and in countercurrent direction with respect to the flames of the burner.

6. The recycling apparatus of claim 1, wherein the first and second wall (4, 7) are cylindrical, the recycling apparatus further comprising an airtight support device, comprising:

a structural element internally defining an aspirating chamber, and comprising, on a relative first side, a first circular opening, and on a relative second side, opposite the first side, a second circular opening; the structural element being arranged with the relative first and second circular opening coaxial to the first rotation axis and surrounding a third section of the rotating cylinder which is transversal to the first rotation axis, and with the aspirating chamber in hydraulic communication with the first air space at the first section of the rotating cylinder; and wherein the aspirating chamber is hydraulically connected to the aspirating device;

at least three connecting elements, each of which having a circular crown segment shape, having a same first radius and together defining a first closed circular crown surrounding the third section of the rotating cylinder and arranged at a third distance from the second wall of the rotating cylinder;

at least a shock absorber device for each connecting element included, in turn comprising: a relative shock absorber axis; a relative fixed portion, fixed to the structural element, the shock absorber axis being radially arranged with respect to the first rotation axis; a relative movable portion, fixed to the fixed portion with freedom to move, with respect to the fixed portion, along the shock absorber axis, wherein an end of the movable portion, which is distal to the fixed portion, is solidly fixed to a different relative connecting element in order to damp the relative connecting element along the relative first radius, which is arranged radially to the rotation axis; at least a wheel for each connecting element included, a pivot for each wheel included, the at least a wheel being rotatably fixed, by means of the relative pivot, to a different connecting element, distally with respect to the relative movable portion and rotatably with respect to a second rotation axis passing through the pivot and parallel to the first rotation axis, in such that the least a wheel projects from the relative connecting element by a fourth distance identical to the third distance, in order to externally contact the second wall of the rotating cylinder;

at least a joint element for each connecting element included, each of which having a circular crown segment shape, having a same second internal radius and together defining a second closed circular crown surrounding the third section of the rotating cylinder and arranged at a fifth distance from the second wall of the rotating cylinder that is smaller than the third distance so as to function as a seal flange; wherein the at least a joint element is fixed to the pivot of a different at least a wheel in such a way as to project from the relative connecting element by a fourth distance in order to externally contact the second wall of the rotating cylinder.

7. The recycling apparatus of claim 1, further comprising: a mixing and production chamber of bituminous conglomerate fixed to the rotating cylinder and an infeeding device of pumpable bitumen, for, when the recycling apparatus in operating, continuously receiving, from the mixing and drying chamber, a mixture of aggregates and bitumen obtained by recycling the bituminous conglomerate, which is used, crushed and deriving from removal of one or more layers of a road surface, and producing, by means of addition of the pumpable bitumen, a further bituminous conglomerate utilisable for production of further bituminous conglomerate utilisable, by compacting, for realising a new layer of a road surface.

8. The recycling apparatus of claim 1, wherein the second wall is solidly constrained to the first wall, and the rotation device is arranged externally of the second wall to rotate both the first and the second wall.

9. The recycling apparatus of claim 1, wherein each linking element advantageously has a relative wall inclined by an angle different to 90° with respect to the first rotation axis.

10. The recycling apparatus according to claim 1, wherein each linking element is helical.

11. An airtight support device for rotating cylinders, comprising:

a structural element, for example a casing, internally defining an aspirating chamber, which is hydraulically connectable to an aspirating device, wherein the structural element comprises, on a relative first side, a first circular opening, and on a relative second side, opposite the first side, a second circular opening wherein the first and second circular opening have a relative common axis; wherein the structural element is couplable to a rotating cylinder having a first rotation axis by being arranged externally of the rotating cylinder with the common axis of the relative first and second circular opening being coaxial with the first rotation axis so as to surround a first section of the rotating cylinder, which is transversal to the first rotation axis, with the aspirating chamber being in hydraulic communication with the rotating cylinder at the first section of the rotating cylinder;

at least three connecting elements, each of which having a circular crown segment shape, having a same first radius and together defining a first closed circular crown so as to be able to surround the third section of the rotating cylinder at a relative distance from the rotating cylinder;

at least a shock absorber device for each connecting element included, in turn comprising: a relative shock absorber axis; a relative fixed portion, fixed to the structural element the shock absorber axis being radially arranged with respect to the common axis; a relative movable portion, fixed to the fixed portion with freedom to move, with respect to the fixed portion, along the shock absorber axis, wherein an end of the movable portion, which is distal to the fixed portion, is solidly fixed to a different relative connecting element in order to damp the relative connecting element along the relative radius arranged radially to the common axis; at least a wheel for each connecting element included, a pivot for each wheel included, the at least a wheel being rotatably fixed, by means of the relative pivot, to a different connecting element, distally with respect to the relative movable portion and rotatably with respect to a second rotation axis passing through the pivot and parallel to the common axis, in such that said at least a wheel projects from the relative connecting element in order to be able to externally contact the rotating cylinder;

at least a joint element for each connecting element included, each of which having a circular crown segment shape, having a same second internal radius and together defining a second closed circular crown, in order, when the structural element is coupled to the rotating cylinder, to be arranged at the third section of the rotating cylinder at a relative distance from the rotating cylinder, smaller than the distance at which the first circular crown is arranged, so as to function as a seal flange; wherein the at least a joint element is fixed to the pivot of a different at least a wheel in such a way as to project from the relative connecting element by a same distance as the relative at least a wheel projects from the relative connecting element, in order to externally contact the second wall of the rotating cylinder.

* * * * *